(12) United States Patent
Lertora et al.

(10) Patent No.: US 7,818,163 B2
(45) Date of Patent: Oct. 19, 2010

(54) ARCHITECTURE FOR DYNAMICALLY RECONFIGURABLE SYSTEM-ON-CHIP ARRANGEMENTS, RELATED METHODS AND COMPUTER PROGRAM PRODUCT

(75) Inventors: Francesco Lertora, S. Colombano Certenoli (IT); Michele Borgatti, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1142 days.

(21) Appl. No.: 11/402,281

(22) Filed: Apr. 11, 2006

(65) Prior Publication Data

US 2007/0088537 A1 Apr. 19, 2007

(30) Foreign Application Priority Data

Apr. 11, 2005 (EP) .................................. 05007863

(51) Int. Cl.
G06F 9/455 (2006.01)

(52) U.S. Cl. .............................. 703/28; 716/16; 718/100
(58) Field of Classification Search .................. 703/28; 716/12, 16; 326/41; 718/100
See application file for complete search history.

(56) References Cited

U.S. PATENT DOCUMENTS

| 5,457,410 | A * | 10/1995 | Ting .............................. 326/41 |
| 7,017,136 | B2 * | 3/2006 | Ting .............................. 716/12 |
| 7,409,664 | B2 * | 8/2008 | Ting .............................. 716/12 |
| 2003/0154357 | A1 | 8/2003 | Master et al. |
| 2003/0212853 | A1 | 11/2003 | Huppenthal et al. |
| 2004/0049672 | A1 | 3/2004 | Nollet et al. |
| 2004/0143724 | A1 | 7/2004 | Jacob et al. |
| 2005/0021871 | A1 | 1/2005 | Georgiou et al. |
| 2005/0203988 | A1 * | 9/2005 | Nollet et al. ................. 709/201 |

FOREIGN PATENT DOCUMENTS

EP 1 443 417 A1 8/2004

OTHER PUBLICATIONS

Abke, J., et al., "FPGAs: Architekturen, Systeme und Schaltungspartitionierung," *IT+ TI Informationsrechnik und Technische Informatik*, 42(2):20-26, Apr. 2000.

Borgatti, M., et al., "A Reconfigurable System Featuring Dynamically Extensible Embedded Microprocessor, FPGA, and Customizable I/O," *IEEE Journal of Solid-State Circuits*, 38(3):521-529, Mar. 2003.

Jones, A., et al., "A 64-way VLIW/SIMD FPGA Architecture and Design Flow," in *Proceedings of the 11th IEEE Int'l. Conf On Electronics, Circuits and Systems*, Tel Aviv, Israel, Dec. 13-15, 2004, pp. 499-502.

(Continued)

*Primary Examiner*—Russell Frejd
(74) *Attorney, Agent, or Firm*—Lisa K. Jorgenson; E. Russell Tarleton; Seed IP Law Group PLLC

(57) ABSTRACT

A system-on-chip arrangement having, in possible combination with a processor, a plurality of reconfigurable gate array devices, and a configurable Network-on-Chip connecting the gate array devices to render the arrangement scalable. The arrangement lends itself to be operated by mapping in one device of the gate array a set of processing modules, and configuring another device of the plurality of gate array devices as a microcontroller having stored therein software code portions for controlling inter-operation of the processing modules stored in the one device of the plurality. The arrangement is thus adapted, e.g., to handle different computational granularity levels.

27 Claims, 6 Drawing Sheets

OTHER PUBLICATIONS

Jones, A., et al., "An FPGA-based VLIW Processor with Custom Hardware Execution," in *Proceedings of the ACM/SIGDA 13th Symposium on Field-Programmable Gate Arrays*, Feb. 20, 2005, pp. 107-117.

Liu, J., et al., "Interconnect Intellectual Property for Network-on-Chip (NoC)," *Journal of Systems Architecture*, 50(2-3):65-79, Feb. 2004.

Marsecaux, T., et al., "Interconnection Networks Enable Fine-Grain Dynamic Multi-tasking on FPGAs," *Lecture Notes in Comp. Sci.*, 2438:795-805, Sep. 2002.

Ouaiss, I., et al., "An Integrated Partitioning and Synthesis System for Dynamically Reconfigurable Multi-FPGA Architectures," *IPPS/SPDP Workshops*, Mar. 30, 1998, pp. 31-36.

Paulin, P., et al., "Application of a Multi-Processor SoC Platform to High-Speed Packet Forwarding," in Proceedings of the Design, Automation and Test in Europe Conference and Exhibition, Feb. 16-20, 2004, pp. 58-63.

Rădulescu, A., et al., "An Efficient On-Chip NI Offering Guaranteed Services, Shared-memory Abstraction, and Flexible Network Configuration," *IEEE Transactions on Computer-Aided Design of Integrated Circuits and Systems*, 24(1):4-17, Jan. 2005.

Rose, J. et al., "Architecture of Field-Programmable Gate Arrays: The Effect of Logic Block Functionality on Area Efficiency", IEEE Journal Of Solid-State Circuits, Oct. 1990, pp. 1217-1225, vol. 25, No. 5.

Kouloheris, J. et al., "FPGA Performance versus Cell Granularity", IEEE Custom Integrated Circuits Conference, 1991, pp. 6.2/1-6.2/4.

Singh, S. et al., "The Effect of Logic Block Architecture on FPGA Performance", IEEE Journal Of Solid-State Circuits, Mar. 1992, pp. 281-287, vol. 27, No. 3.

Rose, J. et al., "Architecture of Field-Programmable Gate Arrays", Proceedings of the IEEE, Jul. 1993, vol. 81, No. 7.

Wirthlin, M. et al., "A Dynamic Instruction Set Computer", 1995 IEEE Symposium on Field-Programmable Custom Computing Machines, Apr. 17-19, 1995, pp. 99-107, Napa Valley, California.

Wittig, R. et al., "OneChip: An FPGA Processor with Reconfigurable Logic", 1996 IEEE Symposium on Field-Programmable Custom Computing Machines, Apr. 17-19, 1996, pp. 126-135, Napa Valley, California.

Brebner, G. "The Swappable Logic Unit: a Paradigm for Virtual Hardware", IEEE Symposium on FPGA-Based Custom Computing Machines, 1997, pp. 77-86.

Petrini, F. et al., "k-ary n-trees: High Performance Networks for Massively Parallel Architectures", Proceedings of the 11th International Parallel Processing Symposium, Apr. 1997, pp. 87-93, Geneva, Switzerland.

Jean, J. et al., "Dynamic Reconfiguration to Support Concurrent Applications", IEEE Transactions on Computers, Jun. 1999, pp. 591-602, vol. 48, Issue 6.

Levinson, L. et al., "Preemptive Multitasking on FPGAs", 2000 IEEE Symposium on Field-Programmable Custom Computing Machines, Apr. 17-19, 2000, pp. 301, Napa, California.

Guerrier, P. et al., "A Generic Architecture for On-Chip Packet-Switched Interconnections", Proceedings of the 2000 IEEE Design Automation and Test in Europe, pp. 250-256.

Vanmeerbeeck, G. et al., "Hardware/Software Partitioning of embedded system in OCAPI—xl", Proceedings of the Ninth International Symposium on Hardware/Software Codesign, 2001, pp. 30-35, Copenhagen, Denmark.

Benini L. et al., "Networks on Chips: A New SoC Paradigm", IEEE Computer, Jan. 2002, pp. 70-78.

Mignolet, J-Y. et al., "Infrastructure for Design and Management of Relocatable Tasks in a Heterogeneous Reconfigurable System-On-Chip", Design, Automation and Test in Europe Conference and Exhibition, Mar. 3-7, 2003, Munich, Germany.

Eguro, K. et al., "Issues and Approaches to Coarse-Grain Reconfigurable Architecture Development", Proceedings of the 11th Annual IEEE Symposium of Field-Programmable Custom Computing Machines, 2003.

Slade, A. et al., "Reconfigurable Computing Application Frameworks", Proceedings of the 11th Annual IEEE Symposium of Field-Programmable Custom Computing Machines, 2003.

Tredennick, N. et al., "You Want One Do-It-All Device, Special Report", IEEE Spectrum, Dec. 2003.

Verkest, D. "Machine Chameleon", IEEE Spectrum, Dec. 2003.

Mondinelli, F. et al., "A 0.13um, 1Gb/s/channel Store-and Forward Network on-Chip", IEEE International SOC Conference, Sep. 12-15, 2004, Santa Clara, California.

Lysecky, R. et al., "Reconfigurable Logic Architecture for Dynamic Hardware/Software Partitioning", Design, Automation and Test in Europe Conference and Exhibition, 2004.

\* cited by examiner

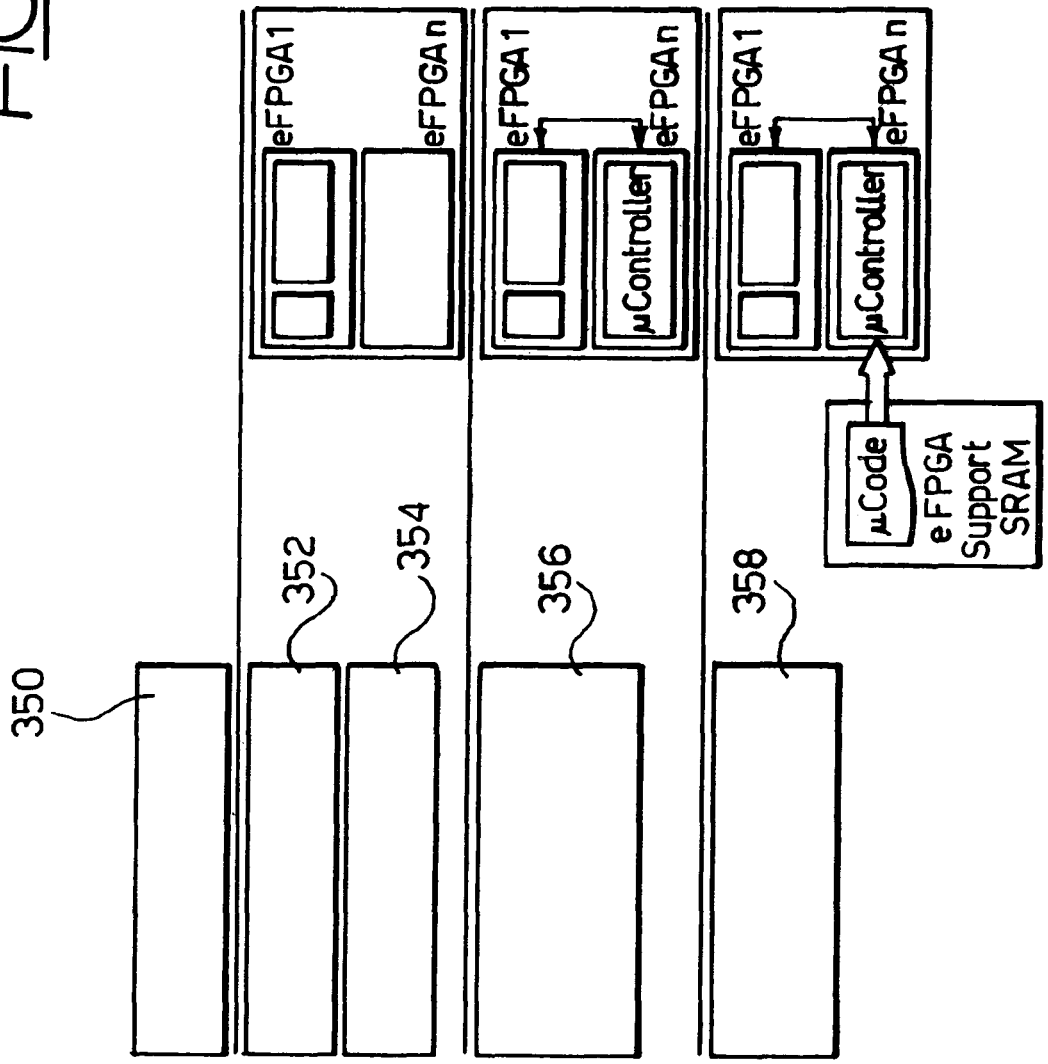

ARCHITECTURE FOR DYNAMICALLY RECONFIGURABLE SYSTEM-ON-CHIP ARRANGEMENTS, RELATED METHODS AND COMPUTER PROGRAM PRODUCT

BACKGROUND OF THE INVENTION

1. Field of the Invention

The invention relates to system-on-chip (SoC) arrangements and, in particular, to reconfigurable integrated circuits (ICs).

2. Description of the Related Art

The inherent limits of sub-micrometric technology pose new challenges to the world of reconfigurable platforms. The capability of shrinking into silicon very large quantities of transistors permits integration in a single die of very complex functions and features. At the same time, the complexity of last-generation reconfigurable devices is not fully met by the sophistication of the tools used to map applications on these architectures. Users of reconfigurable device platforms must devote significant efforts in "extracting" the maximum expected potential performance levels through "custom" mapping solutions.

Meanwhile, "Do-It-All Devices" are now being considered in order to execute very complex software applications with high performance/energy ratios required. Exemplary of these efforts are, e.g., the papers by N. Tredennick and B. Shimamoto: "You Want One Do-It-All Device. Special Report", IEEE Spectrum, December 2003 or D. Verkest: "Machine Chameleon", IEEE Spectrum, December 2003.

A large number of works in the literature deal with the advantages and disadvantages of coarse and fine grain computational resources; see, for instance:

Jonathan Rose, Abbas El Gamal and Alberto Sangiovanni-Vincentelli: "Architecture of Field-Programmable Gate Arrays", Proceedings of the IEEE. Vol. 81, No. 7, July 1993;

Jack L. Kouloheris, Abbas El Gamal: "FPGA Performance versus Cell Granularity", Custom Integrated Circuits Conference, 1991, Proceedings of the 1991 IEEE Custom Integrated Circuits Conference, pp. 6.2/1-6.2/4

J. Rose, R.J. Francis, D. Lewis and P. Chow: "Architecture of Field-Programmable Gate Arrays: The Effect of Logic Block Functionality on Area Efficiency", IEEE Journal Of Solid-State Circuits, Vol. 25, No. 5, October 1990, pp. 1217-1225; or Satwant Singh, Jonathan Rose, Paul Chow, David Lewis: "The Effect of Logic Block Architecture on FPGA Performance", IEEE Journal Of Solid-State Circuits, Vol. 27, No. 3, March 1992, pp. 281-287.

Usually these papers primarily focus on FPGA (Field Programmable Gate-Array) basic blocks by trying to understand for instance, for a given application class, what is the right Look-Up Table (LUT) size or if it is preferable to have arrays of complex logic blocks like Arithmetical Logical Units (ALUs), and so on.

More recent works such as, e.g.:

Ken Eguro, Scott Hauck: "Issues and Approaches to Coarse-Grain Reconfigurable Architecture Development", Proceedings of the 11$^{th}$ Annual IEEE Symposium of Field-Programmable Custom Computing Machines (FCCM'03); or Anthony L. Slade, Brent E. Nelson and Brad L. Hutchings: "Reconfigurable Computing Application Frameworks", Proceedings of the 11$^{th}$ Annual IEEE Symposium of Field-Programmable Custom Computing Machines (FCCM'03)

are based on the common idea that the present scenario for the reconfigurable platforms is more complex, so that a change in the abstraction level is required.

When analyzing a modern DSP application like an MPEG decoder, it becomes immediately clear that the high number of complex computational kernels makes it difficult to say what the right computational granularity could be. Present commercial solutions attempt to cope with the increasing demand for computational power by using hardware solutions involving the fastest available floating point/fixed point DSP devices (still writing down all the software in optimized assembler code) and state-of-the-art microprocessors. Marketing and energy considerations aside, both solutions are obviously able to give to the consumer world the required MIPS/FLOPS.

More to the point, if no specific requirements in terms of, e.g., cost, power consumption, integration, development times are to be complied with, the possibility exists of finding a hardware or software or combination hardware and software platform adapted to support the necessary computational load. For instance, a complex application such as a MPEG4 decoder can be managed by a dedicated SoC, a certain numbers of DSPs or a microprocessor having a sufficiently high clock frequency.

However, a reconfigurable device would offer the advantage of adapting itself in the most effective/efficient way to a specific application within a wide class of applications. The same remarks made in the foregoing generally apply to the prior art arrangements disclosed in patent documents such as, e.g., US-A-2004/0049672, US-A-2004/0143724, now U.S. Pat. No. 7,502,915, US-A-2003/0212853 or US-A-2003/0154357, now U.S. Pat. No. 7,325,123, and specifically, EP-A-1 443 417. This last-cited document discloses a reconfigurable system exemplary of this technology.

BRIEF SUMMARY OF THE INVENTION

Historically, reconfigurable devices have the potentiality to exceed DSP-like performance with higher flexibility and energy savings.

A modern reconfigurable system should however be designed having in mind the nature of the applications expected to run on it.

As an example, one may consider an IMDCT (Inverse Modified Cosine Discrete Transform). Is this a coarse or a fine computational resource with respect to an MPEG decoder? In fact, the IMDCT can be set up with many floating point operations. Are these operators coarse or fine respect to the IMDCT?

Because of its intrinsic nature, a reconfigurable architecture must support different levels of granularity. For example, a single floating point multiplication can be considered a coarse grain computational resource if a "classical" measure for FPGA granularity is used. Conversely, it may not represent a significant computational task if complex algorithms are involved.

A possible objection to the proposed example could be that a fixed-point conversion is always possible in order to improve software performance. However, this approach would take the reconfigurable platform design in the wrong direction. In fact, one may more than reasonably question why a user should waste time converting all the arithmetical operators and taking care for the formal consistency of the algorithm if a reconfigurable resource is available.

With this scenario in mind, the need evidently exists for a reconfigurable System-on-Chip (SoC) adapted to meet two basic requirements:

new generation reconfigurable devices must be capable of being "trimmed" to the final applications by supporting different computational granularity levels;

system architecture scalability and flexibility take precedence over the reconfigurable device logic granularity.

Such an arrangement has to be able to support the concepts of swappable logic units proposed, e.g., in Gordon Brebner: "The Swappable Logic Unit: a paradigm for Virtual Hardware", IEEE Symposium on FPGAs for CCMs, 1997, pp. 77-86 and the "reconfigurable resources multitasking" as proposed, e.g., in L. Levinson, et al.: "Preemptive Multitasking on FPGAs", 2000 IEEE Symposium on Field-Programmable Custom Computing Machines, Apr. 17-19, 2000 Napa, Calif., pp. 301 or Jack Jean, et al.: "Dynamic Reconfiguration to Support Concurrent Applications", IEEE Transactions on Computers, Volume 48, Issue 6, June 1999, pp. 591-602.

This result will be achieved by using a single chip integrated solution with "off-the-shelf" microprocessor and embedded FPGA (eFPGA) and possibly resorting to a common infrastructure for hardware and software processes in a real time operating system along the lines of the arrangement disclosed in J-Y Mignolet, V. Nollet, P. Coene, et al.,: "Infrastructure for Design and Management of Relocatable Tasks in a Heterogeneous Reconfigurable System-On-Chip", Design, Automation and Test in Europe Conference and Exhibition (DATE'03), Mar. 03 -07, 2003 Munich, Germany.

The disclosed embodiments of the present invention provide a fully satisfactory response to the need outlined in the foregoing.

According to one embodiment of the present invention, a method as well as a related computer program product, loadable in the memory of at least one computer and including software code portions for performing the steps of the method of the invention when the product is run on a computer is provided. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility of implementation of the present invention in a distributed/modular fashion.

One embodiment of the invention is in the form of a system-on-chip integrating a processor (e.g., ARM926EJS), three embedded FPGAs (eFPGAs), which are exemplary of a parametric reconfigurable platform (i.e., reconfigurable gate array devices), and a Network-On-Chip (NoC). Such a system is capable of executing complex multimedia applications through the use of hardware accelerators to be mapped on a reconfigurable platform based on a message-passing architecture. Computational kernels can be mapped as hardware autonomous processes inside the eFPGAs or locally accelerated through the usage of dedicated microprocessor coprocessors. Each eFPGA in the system can be independently programmed and can share logic features with the others eFPGAs using intra-communication channels. The architecture is highly scalable since the number of eFPGAs can be controlled and the reconfigurable platform communication channels are based on a configurable NoC. The silicon area required by the system is 26 mm2. A ten times increase in speed has been measured in a MP3 Player mapping example.

In accordance with another embodiment of the invention, a system-on-chip arrangement is provided that includes a plurality of reconfigurable gate array devices, and a configurable Network-on-Chip connecting the plurality of gate-array devices to render the arrangement scalable.

In accordance with another embodiment of the invention, a method is provided for operating an arrangement that includes a plurality of gate array devices, the method including the steps of mapping in one gate array device of the plurality of gate array devices a set of processing modules, and configuring another gate array device of the plurality as a microcontroller having stored therein software code portions for controlling inter-operation of the processing modules stored in the one gate array device of the plurality.

In accordance with yet another embodiment of the invention, a circuit is provided, the circuit including a plurality of field-programmable gate array devices coupled to a processor for interoperation of the plurality of gate array devices, the processor comprising an ARM-based processor, and a configurable network-on-chip connecting the plurality of gate array devices to enable a scalable arrangement, the network-on-chip coupled to the plurality of gate array devices via message interfaces for each of the plurality of gate array devices.

BRIEF DESCRIPTION OF THE DRAWINGS

The disclosed embodiments of the present invention will now be described, by way of example only, with reference to the annexed figures of drawing, wherein:

FIG. 6 is a functional diagram representative of a procedure used in the context of the arrangement described herein.

DETAILED DESCRIPTION OF THE INVENTION

The following is a detailed description of a reconfigurable architecture aimed at dealing in an innovative manner with the concept of computational granularity.

Figure 1:
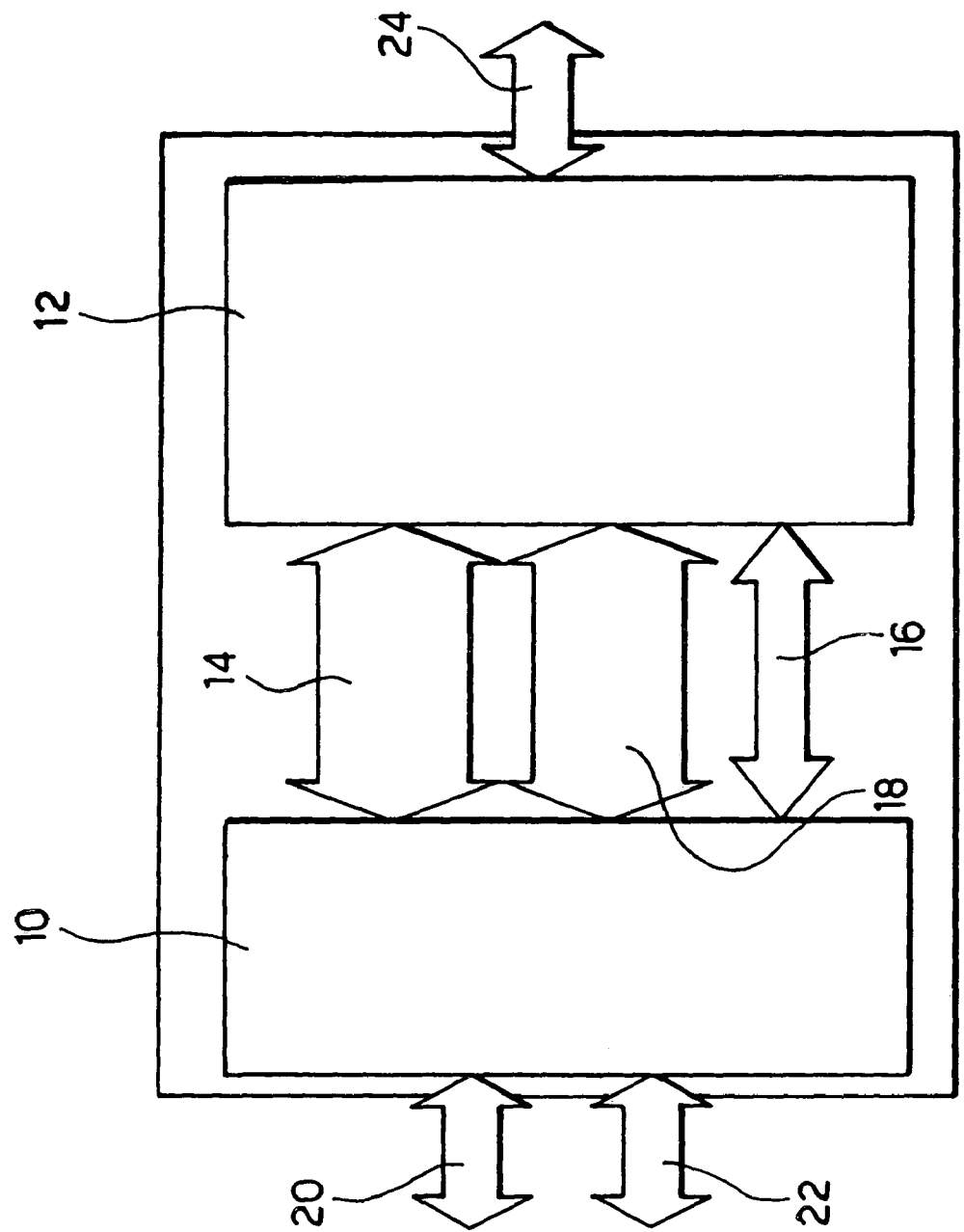
FIG. 1 is a functional diagram of a top-level architecture of a system as described herein.

Essentially, the top-level system architecture shown in FIG. 1 is the integration of, e.g., an ARM-based processor sub-system 10 with a customizable reconfigurable platform 12. The ARM sub-system 10 (to be described in greater detail in the following) is interfaced with the reconfigurable platform 12 (again to be described in greater detail in the following) via AMBA Buses 14, Interrupts 16 and Coprocessor channels 18.

The ARM sub-system 10 interfaces with an External Memory Bus 20 and General Purpose Input/Output lines (GPIOs) 22.

The reconfigurable platform 12 similarly interfaces with General Purpose Input/Output lines (GPIOs) 24 and can be sized to meet different application requirements. Its basic blocks are customizable and the common communication infrastructure is based on a message-passing architecture implemented using a Network-on-Chip (NoC). As used herein, the designation "Network-on-Chip" applies to a Multipoint interconnection architecture where the information is exchanged using packets routed by node switches. A NoC substitutes the "classical" concept of bus transaction with the technology used in packet-switched networks (used, for example, on the phone lines and on the WAN data networks).

For a general discussion of the concept of NoC reference may be had, e.g., to:

- Luca Benini and Giovanni De Micheli. "Networks on Chips: A New SoC Paradigm". IEEE Computer, January 2002, pp. 70-78;
- Fabrizio Petrini, Marco Vanneschi. "k-ary n-trees: High Performance Networks for Massively Parallel Architectures.", Proceedings of the 11$^{th}$ International Parallel Processing Symposium, IPP'97, pp. 87-93, Geneva, Switzerland, April 1997; and
- P. Guerrier and A. Greinier. "A Generic Architecture for On-Chip Packet-Switched Interconnections", Design Automation and Test in Europe, Proceedings of the 2000 IEEE Design Automation and Test in Europe, pp. 250-256.

Figure 2:
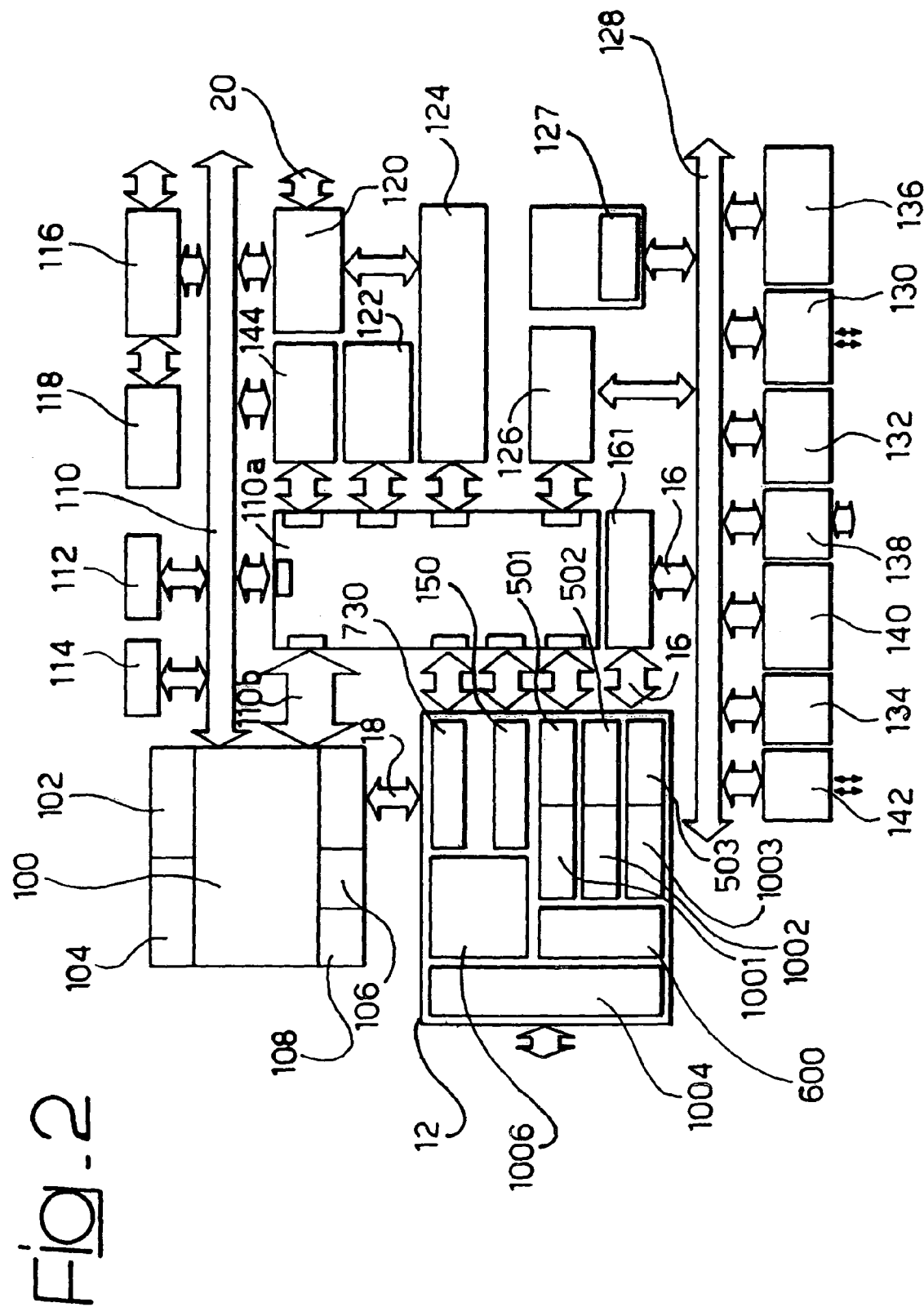
FIG. 2 is a block diagram of a corresponding processor system architecture.

The architecture of the processor platform 12 is shown in greater detail in FIG. 2. This is based on a microprocessor 100 such as, e.g., an ARM926EJS microprocessor equipped with 32 KB+32 KB instruction and data caches 102, 104 and 16 KB+16 KB instruction and data tightly coupled memories (TCM) 106, 108 interfaced on a layered AHB AMBA Bus. The ARM926EJS core is also equipped with the ARM Embedded Trace Macrocell (ETM9) 720. Masters on the main bus 110 are also a 4-channels DMA controller 112 and an AMBA Test Interface Controller (TIC) 114.

AHB slaves are a shared memory controller 116 able to open a communication channel with the "outer" world through a 4 KB SRAM buffer 118, a ROM/FLASH external memory controller 120, 16 KB of embedded SRAM 122, and a SDRAM controller 124. A PLL controller 126 allows an accurate change of the operating bus and processor frequency and manages the system reset commands and clocks.

An AHB/APB bridge 126 links the main bus 110 (more specifically, the related AHB Bus matrix 110a) with a peripheral bus 128 where "standard" Ips like an I2C master 130, a watchdog controller 132, a real time clock manager 134, and the system global configuration 136 are interfaced possibly along with other GPIOs 138, general purpose timers 140, and a Universal Asynchronous Receiver-Transmitter (UART) 142.

The bus architecture around the AHB matrix 110a aims at achieving the maximum possible parallelism between the microprocessor 10 and the reconfigurable platform 12. While the microprocessor instruction bus 110 is interfaced directly to the main bus, the related data bus 110b is connected to the matrix 110a. To reduce the IOs pad number the external memory controller has only one output port shared with the SDRAM controller so joining the microprocessor data bus on the main bus would limit the Harvard microprocessor parallelism.

A specific bridge (AHB2AHB) 144 reduces the bus contentions taking the instruction data cycles on the main bus only when this is strictly necessary.

Figure 3:
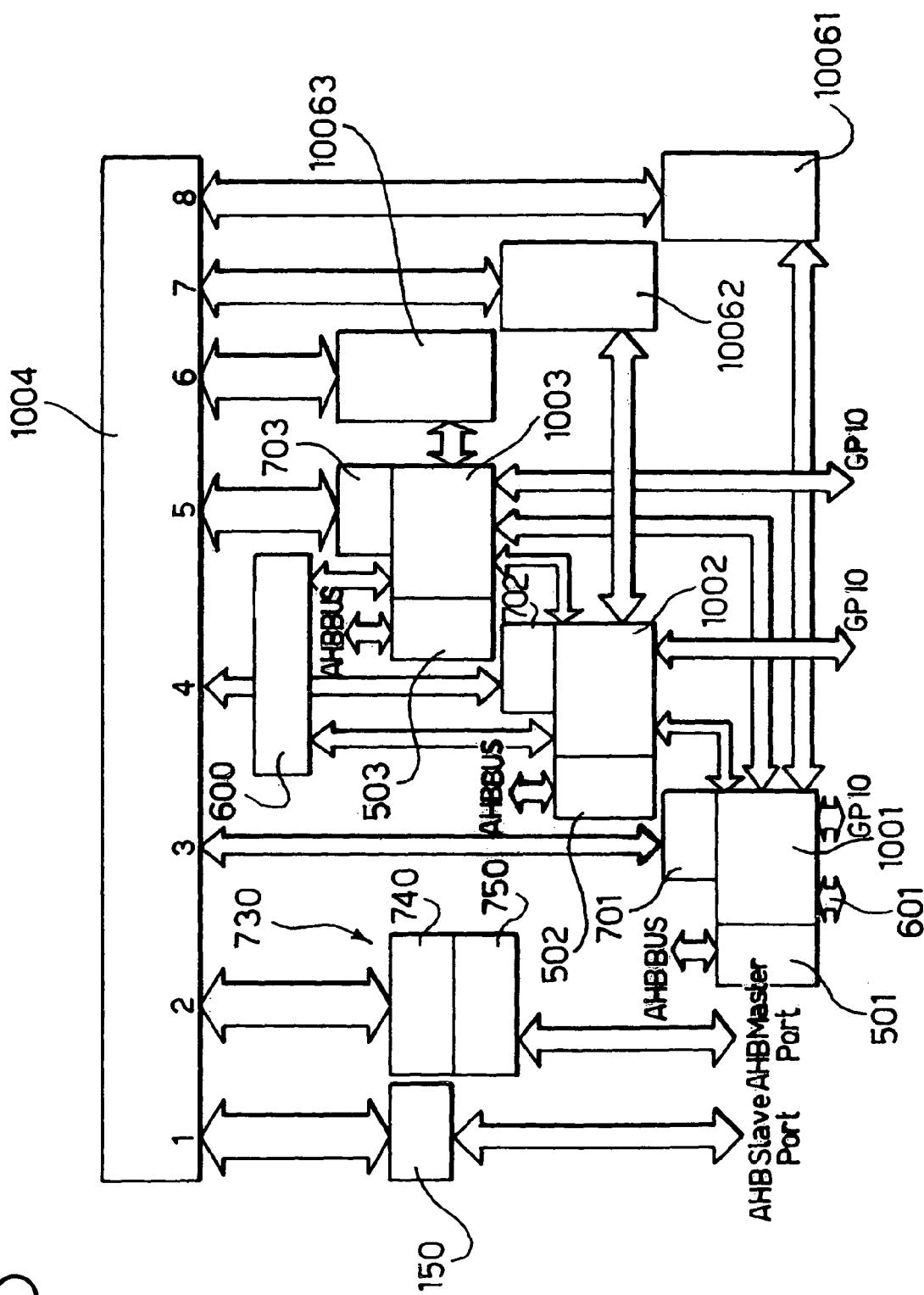
FIG. 3 is a block diagram of a customized reconfigurable platform architecture along the lines of the present disclosure.

A detailed representation of an integrated reconfigurable platform architecture customized with three embedded FPGAs (eFPGAs) 1001,1002,1003 and an eight port NoC 1004 is shown in FIG. 3; there, the same reference numerals have been used to indicate parts or components identical/equivalent to parts or components represented in FIG. 2. The eFPGAs 1001,1002, and 1003 have the approximate capacity of 20 KAsic equivalent Gates with 512+512 available input and output pins. Such eFPGAs are disclosed in detail—at the time of filing of this application—e.g., at the website addresses http://www.m2000.fr (M2000, FlexEOS Documentation [online]) or hftp://www.embedded-fpga.com.

The eFPGA architecture is preferably the same described in Michele Borgatti, Francesco Lertora, Benoit Forêt, Lorenzo Calì, "A Reconfigurable System Featuring Dynamically Extensible Embedded Microprocessor, FPGA and Customizable I/O", IEEE Journal Of Solid State Circuits, Vol. 38, No 3, March 2003, and is based on a hierarchical multilevel network interconnecting an array of multifunction logic cells (MFC). An MFC is a four-input/one-output programmable structure comprised of a four-input look-up table and a storage element (dff). The eFPGA cut used for this project may be set up by 4096 MFC but larger arrays are possible.

Figure 4:
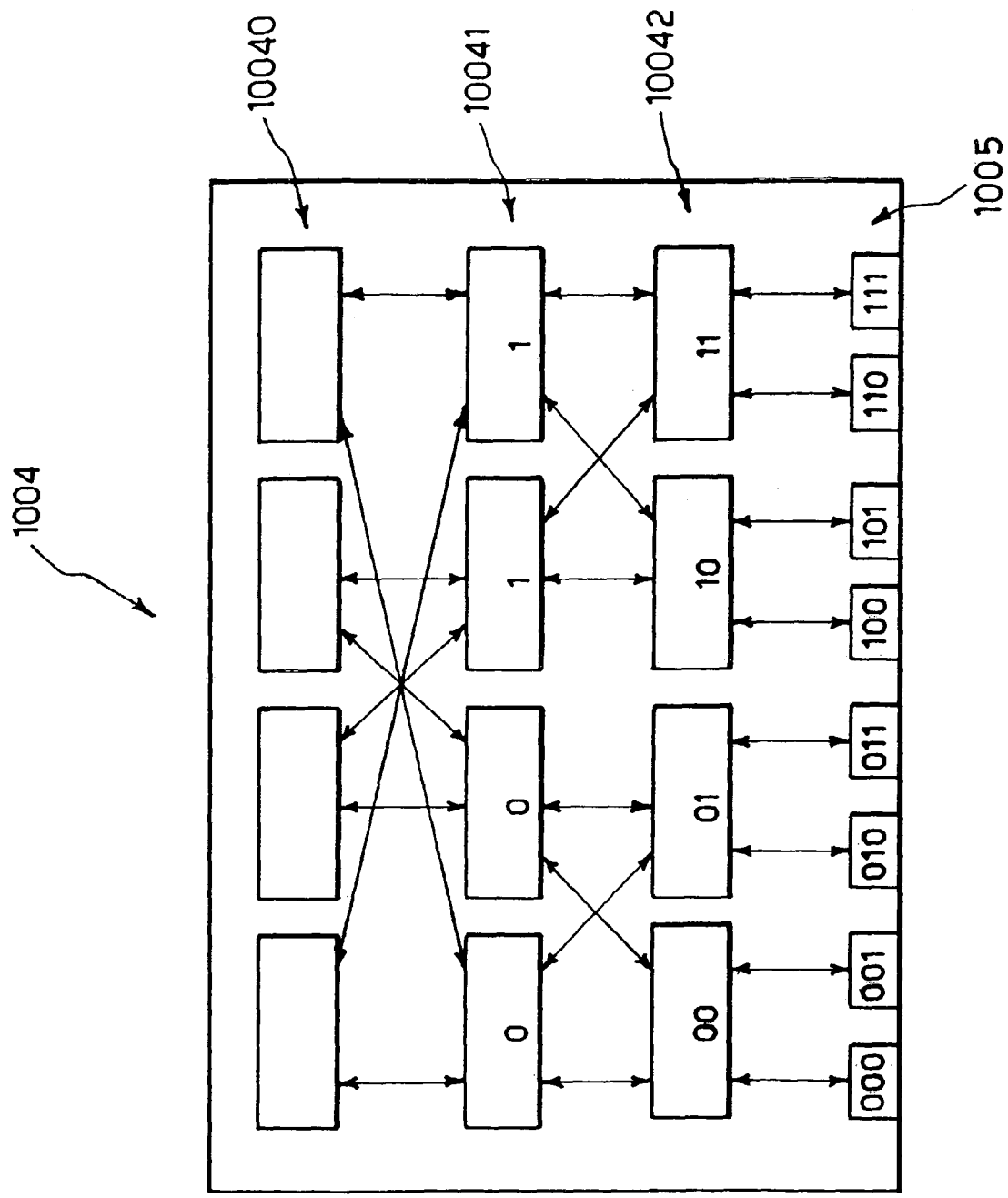
FIG. 4 is representative of a related Network-On-Chip (NOC) architecture.

The communication channel connecting the reconfigurable platform resources is an eight-port, three-level, fat-tree Network-On-Chip (NoC) 1004 with a 10×32 bit-words packet size, as schematically shown in FIG. 4. There, the references 10040,10041,10042 designate the root level (Level 0) and the switch levels (Level 1 and 2) of the NoC, while the reference 1005 designates the NoC ports. The NoC architecture shown is a customization of the one presented in Filippo Mondinelli, Michele Borgatti, Zsolt M. Kovacs Vajna: "A 0.13 um, 1 Gb/s/channel Store-and Forward Network on-Chip", IEEE International SOC Conference, Sep. 12-15 2004, Santa Clara Hilton, Santa Clara, Calif.

The packed size for this NoC is fixed and is configured as a result of a judicious trade-off involving the network latencies and related overhead to make the packet. The 10×32 bit-words number was considered a good trade-off as data exchange unit to and from the reconfigurable platform. This is suitable to handle simple IEEE POSIX messages (see, e.g., IEEE Std. 1003.1-1998 "Portable Operating System Interface for Computer Environments"). In the packed format, only the first byte is used to address the resources connected to the network (4 bit used as source address, 4 bit used as destination address). The packet latency for this NoC customization ranges from two clock cycles (if the data exchange involves only a level 2 switch) to 432 clock cycles (if the data exchange involves a root level-0 switch). The main access bridge between the reconfigurable platform and the System-On-Chip is the AHB Slave interface (AHB2NoC) 150 connected on NoC port one. This link provides a software-based platform configuration and control. The eFPGAs can be independently programmed using their specific 32 bit parallel programming interface each connected with a specific NoC port. The eFPGAs can be programmed both under software control by the ARM926 (by pushing NoC configuration packets into NoC port one) or programming a fast DMA transfer using the platform master port connected on NoC port number two.

As better shown in FIG. 3, the DMA device (DMA2NoC) 730) is set-up by two modules: the "lite AHB to NoC" DMA core 740 (that provides the interface with the NoC port) and the "lite to AHB" Bridge 750 (that interfaces the DMA with the AHB bus). The eFPGA binary bitstream is nearly 35 KB and can be downloaded under software control in about 10 msec with a 120 MHz bus frequency or in about 500 µs using the DMA.

The reconfigurable platform architecture 12 has been customized to handle a maximum number of, for example, five autonomous hardware processes within each eFPGA. These processes will exchange information with the rest of the system using "messages" as an Inter-Process-Communication (IPC) instance—see again IEEE Std. 1003.1-1998 "Portable Operating System Interface for Computer Environments".

The base data unit for a message is a NoC packet. A Main Versatile Message Interface (VMI) 1006 has the function of interfacing the eFPGA message ports with the NoC. Essentially, these are the three tasks handled by the VMI:

decoding and forwarding the NoC packets to the right eFPGA message port;

setting-up a communication channel starting from a request from an eFPGA message port; and implementing an automatic procedure to recognize if an hardware process is interfaced with a given eFPGA message interface.

The Versatile Message Interface (VMI) 1006 is in fact comprised of various VMI blocks 10061,10062,10063 designed by taking into account two basic constraints:

allowing maximum programmability for the physical (hardware mapped on an eFPGA) and logical (software representation for the hardware processes mapped on an eFPGA) world on an eFPGA mapping; and ensuring that the logic to be mapped within the eFPGA to take care of the communication protocol with the VMI is to be as small as possible.

Figure 5:
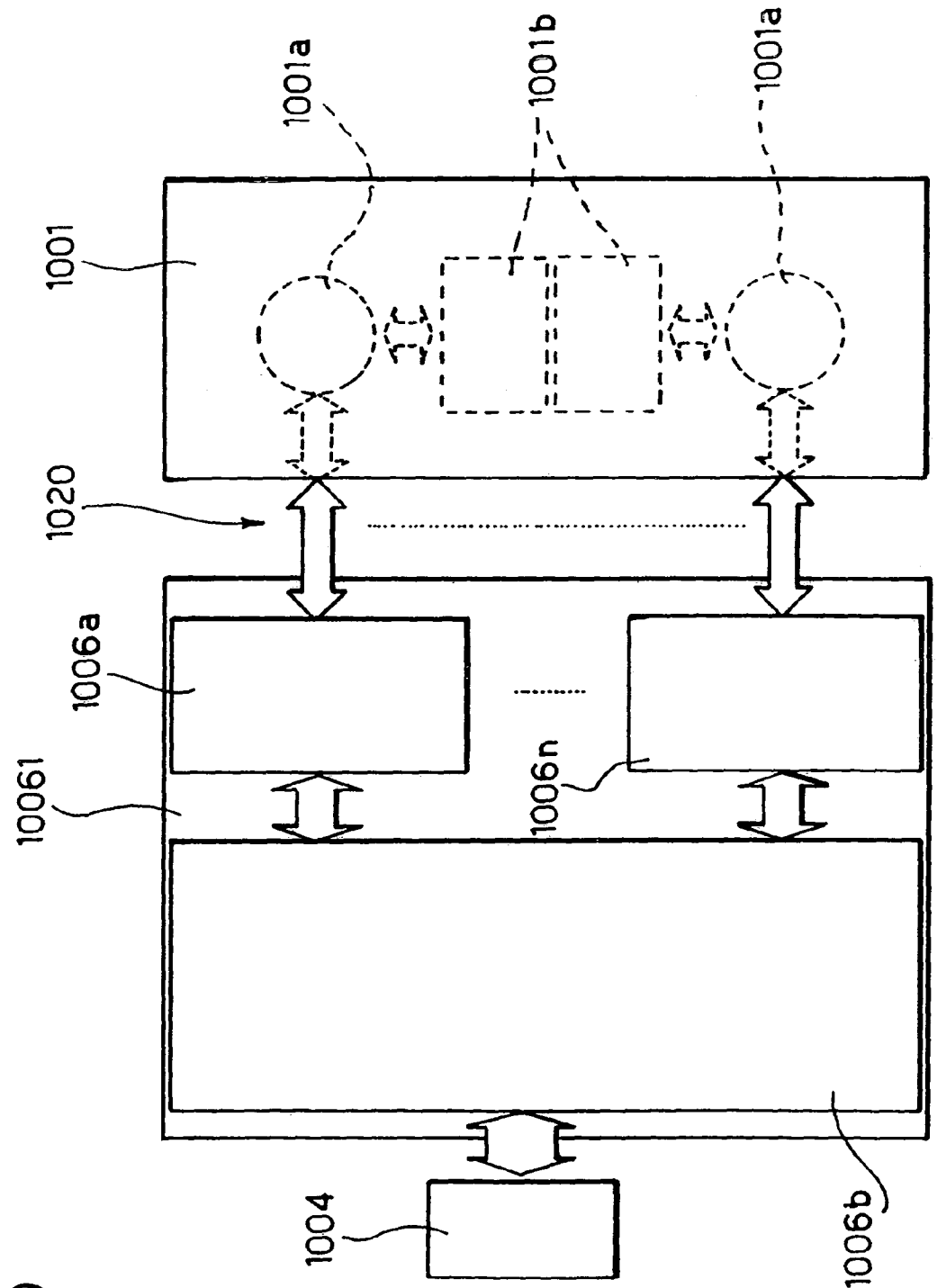
FIG. 5 is representative of an eFGPA versatile Message Interface (VMI) architecture.

The interface architecture between any of the single VMI blocks (the block 10061, by way of example) and an eFPGA (the eFGPA 1001, again by way of example) is depicted in FIG. 5.

Each VMI block is able to handle all the communication channels between the hardware processes mapped on an eFPGA and the NoC.

In order to reduce the complexity and related logic size of the eFPGA Control Units (FCU—shown in shadow lines as 1001a) that need to be mapped inside the eFPGAs, the related communication protocol is designed to be as simple as possible. Each FCU 1001a takes care of a single eFPGA hardware process 1001b and is interfaced with one of a plurality of VMI ports 1020. Each VMI core 1006a, . . . , 1006n handles the communication between an eFPGA channel (and the related processes) and the VMI. All the messages transfer requests to and from an eFPGA are controlled by a VMI scheduler 1006b. According to a fixed priority arbitration scheme, the VMI scheduler 1006b enables (grants) or stops (in a wait state condition) the NoC or the VMI Core interfaces.

Each VMI Core 1006a, . . . , 1006n (and the related FCU) has an assigned physical address while the scheduler 1006b handles the data communication using eFPGA port virtual addresses. A programmable hardware conversion table is stored inside the VMI scheduler 1006b. Each row of this table links a virtual address with its related physical address. All VMI parameters can be programmed using special NoC control packets coded using the 24 unused bits on the first 32 bit packet word.

The eFPGA architecture used may not support direct memory mapping. In that case, each eFGPA module 1001, 1002,1003 can be interfaced with a dedicated external dual port SRAM 501, 502, 503. The other ports of these memories are interfaced with the system AHB bus.

Further, to avoid wasting reconfigurable resources through the mapping of simple registers, the second and third eFPGAs 1002 and 1003 are interfaced with a 128×32 bit word register file (Reg. File) 600. The first eFPGA 1001 has a dedicated link 601 to the system microprocessor 100. The connections of all the eFGPAs 1001,1002, 1003 to the NoC 1004 include program interfaces 701, 702, 703.

The ARM926 processor has a quite flexible coprocessor interface. This permits designing extensions able to follow (or to stall, if necessary) the main processor pipeline and to execute load-stores within the microprocessors address space: this architectural feature thus represents an easy way to improve system performance. The eFPGA coprocessors run at the same microprocessor clock frequency. As shown in FIG. 3, all the eFPGAs 1001,1002, and 1003 have dedicated connections with the system GPIOs and are able to generate interrupt signals connected to the system interrupt controller 161 (see FIG. 2). Finally, all unused eFPGA inputs and outputs have been used to interconnect the eFPGA between them. These intra-connections can be used to partition the design to map when it is too big for a single eFPGA.

All the basic "soft" modules on the reconfigurable platform (VMI Scheduler, VMI Cores, NoC, and Register File) are designed as customizable HDL so the architecture can be easily expanded to support more eFPGAs, VMI Cores and larger NoC, according to specific requirements and available silicon area.

A measure to evaluate the architecture efficiency for a given reconfigurable platform customization is the ratio between the total eFPGA equivalent Asic-gates and the gates integrated as "soft" modules.

For the customization depicted on FIG. 3 this ratio can be approximated with:

$$\frac{\text{Total\_eFPGA\_Equivalent\_AsicGates}}{220K + 30K \times (1 + \text{eFPGA\_Message\_Ports})}$$

The number of message ports for each eFPGA is used to evaluate the VMI logic size. Each programming interface is about 10 K Asic-gates while the 220 Kgates take into account the eight-port NoC, the DMA, the AHB slave interface and the register file.

With the architectural customization integrated into silicon, this ratio is about 1/6. This means that for every reconfigurable gate there are six Asic-gates used to implement the platform. If the eFPGA message ports are reduced, the VMI logic will be smaller but this will affect the architecture potentialities. Increasing the number of the integrated eFPGAs the total reconfigurable available gates are increased but this involves using a larger NoC. Raising the equivalent eFPGAs logic capability is the simplest way to increase the architecture efficiency since it does not affect the platform "soft" modules logic size. From the technological point of view, the platform area efficiency is measured by the ratio between the total eFPGAs silicon area and the area required by the place&routed "soft" modules. For the integrated reconfigurable platform this ratio is about 5/1.

The reconfigurable platform architecture just described can be used to map general purpose IOs handlers or master/slave modules interfaced on a main system bus using the NoC interfaces. However, different computational granularity levels can be handled using this reconfigurable platform as better detailed in the following.

By way of background, the possibility of extending the opcode capabilities of a microprocessor through a SRAM-based reconfigurable resource are described in the literature as witnessed, e.g., by:

Michele Borgatti, Francesco Lertora, Benoit Forêt, Lorenzo Calì: "A Reconfigurable System Featuring Dynamically Extensible Embedded Microprocessor, FPGA and Customizable I/O", IEEE Journal Of Solid State Circuits, Vol. 38, No 3, March 2003;

Michael J. Wirthlin and Brad L. Hutchings: "A Dynamic Instruction Set Computer", 1995 IEEE Symposium on Field-Programmable Custom Computing Machines Apr. 17-19,1995 Napa Valley, Calif., pp. 99-107; and Ralph D. Wittig and Paul Chow: "OneChip: An FPGA Processor with Reconfigurable Logic", 1996 IEEE Symposium on Field-Programmable Custom Computing Machines Apr. 17-19,1996 Napa Valley, Calif., pp.126-135.

If applied to the arrangement described herein, this extension does not require any specific hardware interface since the 'off-the-shelf' ARM926 coprocessor interface (see, e.g., ARM Ltd., "ARM9EJ-S Revision r1p2 Technical Reference Manual", ARM DDI 0222B) and the IOs pins of an eFPGA con be used advantageously for that purpose.

The capability of modifying the functionality of a microprocessor opcode copes with the control on the applications fine grain computational resources. This feature makes it possible to substitute small sections of the application software like, for example, arithmetical operators and floating point extensions. All the application computational kernels that must not be fully swapped into hardware (and so became autonomous hardware processes) can be speeded-up locally using eFPGA coprocessors.

Mapping the complex application computational kernels on the reconfigurable platform represents another interesting asset of the arrangement described herein.

In fact, trying to set-up automated flows that will allow having both the HDL and software already partitioned and ready to be mapped on reconfigurable platforms is known as an option (see, e.g., J-Y Mignolet, V. Nollet, P. Coene, et al.: "Infrastructure for Design and Management of Relocatable Tasks in a Heterogeneous Reconfigurable System-On-Chip", Design, Automation and Test in Europe Conference and Exhibition (DATE'03), Mar. 03-07, 2003 Munich, Germany or G. Vanmeerbeeck, P. Schaumont, S. Vernalde, M. Engels, I. Bolsen: "Hardware/Software Partitioning of embedded system in OCAPI-xl", Proceedings of the ninth international symposium on Hardware/software codesign, Copenhagen, Denmark, pp. 30-35.

Additionally, there exist devices able to monitor their computational kernels and swap them on configurable resources with automated on chip synthesis and place and route tools ("tools on-chip"): see, e.g., Roman Lysecky, Frank Vahid: "Reconfigurable Logic Architecture for Dynamic Hardware/Software Partitioning", Design, Automation and Test in Europe Conference and Exhibition (DATE'04). Specifically, it is generally recognized that in most data-oriented application kernels it is often easy to understand what could be the coarse grain resources that should be better implemented in hardware. Additionally, time-sharing of complex modules is essential since FPGAs have limited logic resources.

Keeping these considerations in mind, the arrangement described herein lends itself to implementing a reconfigurable method using swappable coarse-grain IPs as presented in FIG. 6.

First, in a step 350, the granularity of the application kernels that need to be swapped into hardware is analyzed and the required coarse-grain modules are extracted. This process generally involves a step 352 where the "coarse grain" computational resources are identified and a step 354 where corresponding "coarse grain" modules are mapped on the eFGPA.

The mapped IPs (for example, ALU, FPU, MAC, etc. . . .) will be driven by a specific µcontroller whose execution µcode will be downloaded in the dual-port SRAM available for every eFPGA.

This process in turn involves a step/phase 356 where a µcontroller capable of executing a given computational kernel is designed and mapped on eFPGA, and a step 358, where the memory support for the required microcode is downloaded on eFPGA.

This approach has many advantages.

First, by using a µprogrammed control, the coarse grain resources mapped within the eFPGA can be easily reused. A second level of reconfigurability, this time based on µcode, is thus added.

It is possible to change the eFPGA context downloading a new bitstream but, the possibility also exists of changing the algorithm behavior fixing the logic within the eFPGA by, and changing only the µcode stored in the SRAM. Even the µcontroller can be changed and tuned according to specific application needs. Once the µcontroller executes its µcode, a fully autonomous process originally representing an application computational kernel has been swapped into hardware.

Since all the eFPGAs can be autonomously configured and all of them have the support of a dual port SRAM, different hardware processes can be controlled by different µcontrollers together with the software processes running under the microprocessor operating system control.

Using an eFPGA µprogrammed control has some drawbacks. For instance, this may not be optimal in terms of performance when compared with a dedicated implementation with the same algorithmic behavior. Additionally, the design of the µcontroller is to have a small logic size while at the same time being complex enough to accommodate the algorithm requirements.

However, a judicious design of this logic will allow re-using the same basic controller for different applications, other than for very complex control sequences. The method described in connection with FIG. 6 has been proved to be particularly effective for data-oriented computational kernels.

The reconfigurable architecture presented herein makes it possible to design reconfigurable systems using "off-the-shelf" IPs able to handle different levels of computational granularity. This approach involves keeping the coprocessor interface as simple as possible both to minimize the related logic (mapped on an eFPGA) and to avoid any new stall on the microprocessor pipeline. The resulting reconfigurable opcodes allow efficient optimizations targeted to the code sections selected by software engineers.

The reconfigurable architecture presented herein establishes a relationship between the generation of reconfigurable device and the state-of-the-art microprocessors, whose architectures are evolving beyond the exploitation of the Instruction Level parallelism (ILP) and supporting even more complex SIMD instruction sets. This relationship involves architectural efficiency improvements aimed at increasing microprocessor performance even when simply raising further the operating frequency becomes in fact unfeasible. The reconfigurable architecture presented herein executes fully autonomous processes that free the microprocessor from the most time-consuming kernels and at the same time handle a set of opcodes designed to speed-up well defined application requirements. The ability to reconfigure the eFPGA processes and the coprocessor opcodes is a notable advantage that makes these reconfigurable platforms suitable to map in an efficient way a broad range of application classes.

Specifically, it will be appreciated that in the arrangement described herein the gate array devices 1001, 1002, 1003 define a reconfigurable platform configured for packet-based/message-based communication. The arrangement correspondingly includes a set of interfaces for bridging the packet-based/message-based communication world of the reconfigurable platform with the system-on-chip.

More generally, the arrangement described herein is a microcontroller architecture configured within a reconfigurable device where the used microcode is fetched from a dedicated program memory, the microcontroller being thus capable of controlling reconfigurable coarse grain modules. Preferably, the dedicated program memory is a dual port RAM that can be accessed at the same time by the reconfigurable logic and from the system-on-chip.

Consequently, without prejudice to the underlying principles of the invention, the details and the embodiments may vary, also appreciably, with reference to what has been described by way of example only, without departing from the scope of the invention as defined by the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system-on-chip arrangement, comprising:
a plurality of reconfigurable gate array devices;
a configurable Network-on-Chip connecting said plurality of gate array devices and using versatile message interfaces for each of the plurality of gate array devices to render said arrangement scalable, the versatile message interfaces configured for arbitration and communication between the plurality of gate array devices and the Network-on-Chip; and
a processor for interoperation with said plurality of gate array devices, said processor comprising an ARM-based processor.

2. The arrangement of claim 1 wherein said gate array devices comprise Field-Programmable Gate Arrays.

3. The arrangement of claim 2 wherein said Field-Programmable Gate Arrays are embedded Field-Programmable Gate Arrays.

4. The arrangement of claim 1, comprising at least one additional gate array device for interoperation with said processor and a bus arrangement for connecting said at least one additional device to said processor.

5. A system-on-chip arrangement, comprising:
a plurality of configurable gate array devices connected to a configurable Network-on-Chip via versatile message interfaces to render the arrangement configurable, wherein the versatile message interfaces are configured to perform at least one of the functions selected out of:
arbitration in communication between said gate array devices and said Network-on-Chip, and
packetizing the information exchanged between said gate array devices and said Network-on-Chip,
the versatile message interfaces configured to perform at least one of the functions selected out of:
decoding and forwarding the packets from said Network-on-Chip to said gate array devices,
setting up a communication channel upon request from one of said gate array devices, and
automatically recognizing if a hardware process is interfaced with any of said gate array devices.

6. The arrangement of claim 5, comprising one respective versatile message interface for each of said gate array devices.

7. The arrangement of claim 5 wherein at least a part of said gate array devices are coupled with a register file to avoid mapping of single registers.

8. The arrangement of claim 7, comprising a processor for interoperation with said plurality of gate array devices and in that at least one of said gate array devices has a dedicated link to said processor.

9. The arrangement of claim 8 wherein said gate array devices define a reconfigurable platform configured for packet-based/message-based communication and the arrangement includes a set of interfaces for coupling the reconfigurable platform with the system-on-chip.

10. A method of operating an arrangement including a plurality of reconfigurable gate array devices, a configurable Network-on-Chip connecting the plurality of reconfigurable gate array devices to render said arrangement scalable, a dual port RAM that is accessed at the same time by multiple reconfigurable gate array devices; and a processor for inter-operation with said plurality of gate array devices, the method including the steps of:
fetching processing modules from the dual port RAM for at least one of the plurality of gate array devices;
mapping in one gate array device of the plurality of gate array devices a set of processing modules in the processor, and
configuring another gate array device of the plurality of reconfigurable gate array devices as a microcontroller having stored therein software code portions for controlling inter-operation of the set of processing modules stored in the one gate array device of the plurality of reconfigurable gate array devices.

11. The method of claim 10, comprising the step of said another gate array device of said plurality of gate array devices downloading therein said software code portions for controlling inter-operation of said processing modules stored in said one gate array device of said plurality.

12. The method of claim 10, comprising the step of identifying said processing modules stored in the one gate array device as coarse-grain computational resources.

13. The method of claim 12, comprising the steps of:
identifying said processing modules stored in said one gate array device as a function of the processing module granularity of at least one given application computational kernel, and
configuring the microcontroller having stored therein software code portions for controlling inter-operation of said processing modules stored in said one device of said plurality of field programmable gate array devices to execute said at least one given application computational kernel.

14. The method of claim 13, comprising the steps of configuring in said plurality of gate array devices microcontrollers having stored therein respective sets of software code portions for controlling inter-operation of said processing modules stored in said one gate array device to execute computational kernels of different computational granularity.

15. A microcontroller architecture configured within a reconfigurable gate array device where used microcode is fetched from a dedicated program memory in the form of a dual port RAM that is accessed at the same time by multiple reconfigurable gate array devices.

16. The microcontroller architecture of claim 15 wherein the microcontroller is configured for controlling reconfigurable coarse grain modules.

17. The microcontroller architecture of claim 15 wherein the dual port RAM is accessed at the same time by the reconfigurable gate array devices and from a system-on-chip.

18. A computer readable medium containing software instructions that when executed cause a computer system to reconfigure a system-on-chip by performing a method that comprises the steps of:
mapping in one gate array device of said plurality of gate array devices a set of processing modules;
configuring another gate array device of said plurality of gate array devices as a microcontroller having stored in a memory therein software code portions for controlling inter-operation of said processing modules stored in said one gate array device of said plurality of gate array devices; and accessing the memory at the same time by the plurality of gate array devices and the system-on-chip.

19. The computer readable medium of claim 18, comprising the step of said another gate array device of said plurality of gate array devices downloading therein said software code portions for controlling inter-operation of said processing modules stored in said one gate array device of said plurality of gate array devices.

20. The computer readable medium of claim 18, comprising the step of identifying said processing modules stored in said one gate array device of said plurality of gate array devices as coarse-grain computational resources.

21. The computer readable medium of claim 20, comprising the steps of:

identifying said processing modules stored in said one device of said plurality of gate array devices as a function of the processing module granularity of at least one given application computational kernel, and configuring the microcontroller having stored therein software code portions for controlling inter-operation of said processing modules stored in said one device of said plurality of field programmable gate array devices to execute said at least one given application computational kernel.

22. The computer readable medium of claim 21, comprising the steps of configuring in said plurality of gate array devices microcontrollers having stored therein respective sets of software code portions for controlling inter-operation of said processing modules stored in said one device of said plurality of field programmable gate array devices to execute computational kernels of different computational granularity.

23. A circuit, comprising:

a plurality of field-programmable gate array devices coupled to a processor for interoperation of said plurality of gate array devices, the processor comprising an ARM-based processor; and a configurable network-on-chip connecting the plurality of gate array devices to enable a scalable arrangement, the network-on-chip coupled to the field programmable gate array devices via versatile message interfaces for each of the plurality of gate array devices, the versatile message interfaces configured for arbitration and communication between the plurality of field programmable gate array devices and the network-on-chip.

24. The circuit of claim 23 wherein the versatile message interfaces are configured to perform packetizing information exchanged between the plurality of field programmable gate array devices and the network-on-chip.

25. A circuit, comprising:

a plurality of field-programmable gate array devices coupled to a processor for interoperation of said plurality of gate array devices, the processor comprising an ARM-based processor; and a configurable Network-on-Chip connecting the plurality of gate array devices to enable a scalable arrangement, the network-on-chip coupled to the field programmable gate array devices via versatile message interfaces for each of the plurality of gate array devices wherein the versatile message interfaces are configured to perform at least one of the following functions:

decoding and forwarding packets from the network-on-chip to the plurality of field programmable gate array devices;

setting up at least one communication channel upon request from at least one of the plurality of field programmable gate array devices; and automatically recognizing when a hardware process is interfaced with any of the plurality of gate array devices.

26. The circuit of claim 25 wherein at least a one of the plurality of gate array devices is coupled with a register file to avoid mapping of single registers.

27. The circuit of claim 25 wherein the plurality of field programmable gate array devices define a reconfigurable platform for packet-based/message-based communication, and further comprising a set of interfaces for coupling the reconfigurable platform with the network-on-chip.

* * * * *